Patented Oct. 20, 1931

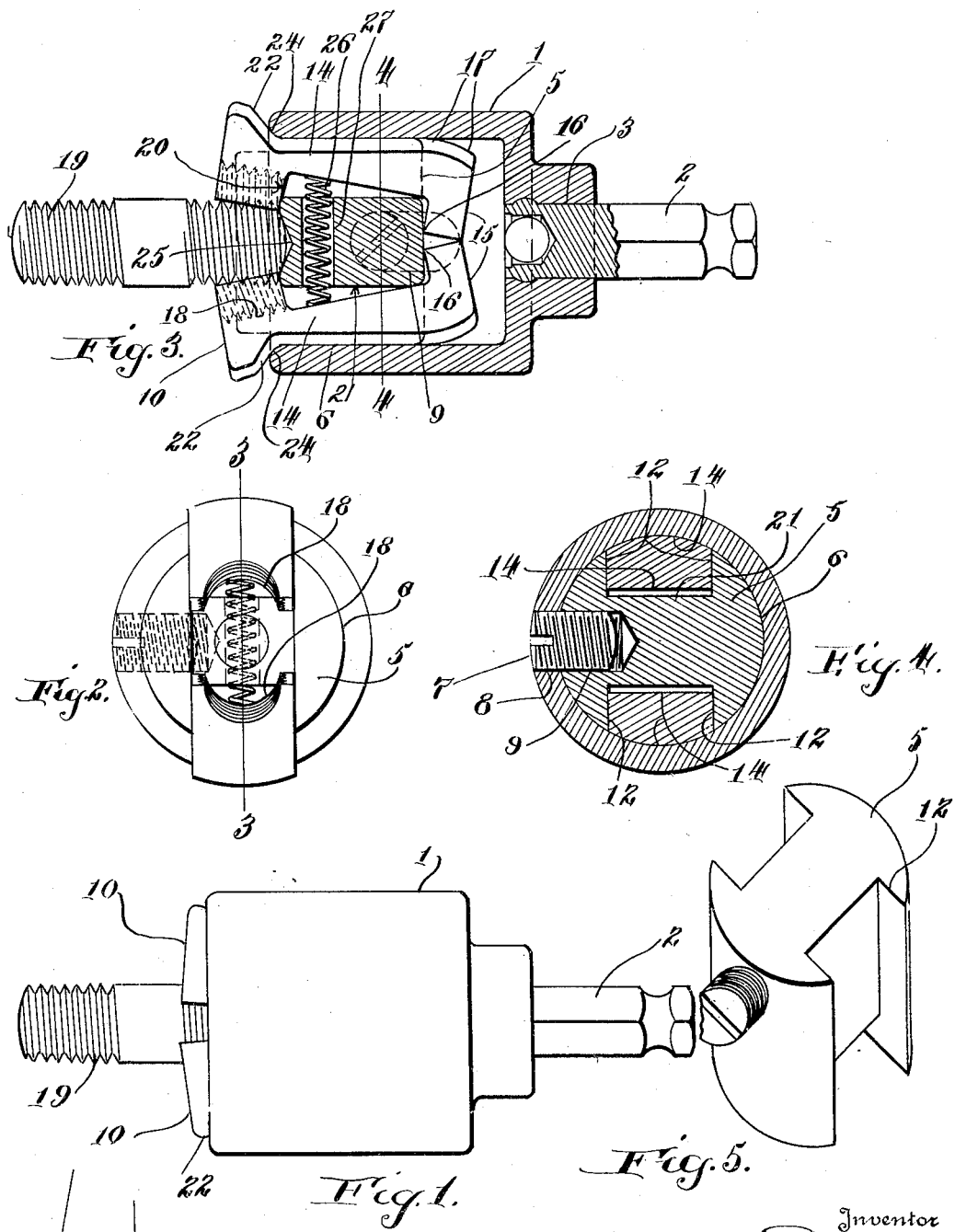
Oct. 20, 1931.      A. G. DECKER      1,828,523
STUD SETTER
Filed Aug. 15, 1925

1,828,523

UNITED STATES PATENT OFFICE

ALONZO GALLOWAY DECKER, OF BALTIMORE COUNTY, MARYLAND, ASSIGNOR TO BLACK & DECKER MANUFACTURING COMPANY, A CORPORATION OF MARYLAND

STUD SETTER

Application filed August 15, 1925. Serial No. 50,531.

This invention relates to an automatic gripping bit, sometimes referred to as a chuck, for use in setting or removing studs, pins, screws, bolts and the like, which cannot be conveniently gripped or turned by means of a screw-driver or wrench.

More particularly the invention relates to an improved stud-setting chuck or bit for use with a portable, power-driven, rotary tool, as a drill, screw-driver or wrench or breast drill.

Appliances of this general nature are known to the art, being described in the patents and made and sold to the trade. Described in a general way, they consist of a bit shank to be engaged by and with the spindle of a rotary, power-driven tool or breast drill, the shank having secured thereto a suitable body or casing in which are mounted two or more gripping jaws which are actuated or closed by the thrust of the tool against the stud or other member to be engaged.

The present invention provides an improved form of jaw and improved means for guiding and actuating the jaws.

In the accompanying drawings I have illustrated a stud-setting chuck embodying the features of my invention in the preferred form.

In the drawings—

Figure 1 is a side elevation of the chuck complete.

Figure 2 is a bottom plan of the same.

Figure 3 is a section on the line 3, 3 of Figure 2.

Figure 4 is a section on the line 4, 4 of Figure 3.

Figure 5 is a perspective on a reduced scale of the carrier.

Referring to the drawings by numerals, each of which is used to indicate the same or similar parts in the different figures, the stud-setting chuck or bit, as shown, comprises a body or cup 1 having a shank 2 which is integrally and permanently connected to the cup in alignment with the axis thereof, being in the form of the invention shown seated at one end in a hole 3 in the bottom of the cup into which it is expanded by any suitable means, as shown.

An important feature of the invention resides in the jaw carrier or block 5, which, as shown, is in the form of a cylindrical member fitting and mounted to slide in the cavity or chamber 6 of the cup or body 1, which cup or body in the form of the invention shown has a slot 8 to receive a screw-pin 7 seated in a tapped hole 9 in the jaw holder and sliding in the slot 8 in the body, which slot is parallel to the axis and limits the motion of the jaw holder and jaws 10 relatively to the chuck body.

The jaw holder or block 5, as shown, has jaw seats or slots 12 along each opposite side, the slots being parallel to the axis and of sufficient width to receive the longitudinal arms 14 of the respective jaws 10, which jaw members 10 are each in the form of a bell crank lever having the longitudinal arms 14, as aforesaid, fitting and swinging and sliding in slots 12, and transverse arms 15, which, as shown, are shorter than the longitudinal arms and at right angles thereto, bearing at their inner ends or toes 16 on the block or jaw holder 5 near the centre of the inner or upper end of the same. Each jaw 10 has a rounded heel portion 17 on its outer surface near its upper or inner end upon which curved heel portion the jaw rocks and slides in contact with the cup or body 1 in opening and closing, and at its outer end each jaw member 10 is provided with jaw surfaces or teeth 18 which are suitably shaped to engage the stud or pin 19 or any stud or pin upon which the tool may be operating. These jaw surfaces or teeth, as shown, are offset inwardly at 20 for convenience in engaging the work, and to pass the central portion 21 of the block or jaw carrier 5 between the slots 12. The opposite face 22 of each jaw member is inclined, as shown, outwardly toward the swinging end of the jaws, providing cam surfaces 22 which engage correspondingly-inclined actuating surfaces 24 on the edge of the casing 1, the engagement of which surfaces serves to close the jaws as they are thrust inwardly by engagement of the tool with the work, as hereinafter described. The jaws are guided in their operation by the slots 12, confining their swing to a radial plane or planes, wherefore the slots 12 have been referred to herein as radial slots or guides. The jaw carrier or block 5 is also provided with a socket 25 at the centre of its forward or bottom surface between the slots, to receive the end of the stud or pin to be engaged by the tool.

The jaws are held normally open as shown in Figures 2 and 3 by a spiral spring 26 which is seated in a transverse aperture 27 in the block or jaw carrier 5 between the slots 12, which spring engages the longitudinal arms 14 of the jaws 10 from the inner side, forcing them outwardly and holding them open. The pressure of the springs acting on the jaws as described, causes the inclined surfaces 22 on the jaws to press against actuating surfaces 24 of the chuck body, sliding and swinging the jaws outwardly and moving the carrier 10 to the extreme outermost position illustrated in Figures 2 and 3, in which, as aforesaid, the jaws are open.

In the operation of the tool it is brought into engagement with the stud or pin 19 by inserting the pin between the jaws or more properly passing the tool over the pin, so that the latter end is received between the jaws, the end of the pin or stud occupying the socket 25 in the jaw carrier. Pressure is then applied by the operator to the tool, forcing it down on the stud. The application of pressure, as described, tends to slide the carrier 5 backward or upward into the cavity 6 in the casing or cup 1, carrying with it the jaws 10, which as aforesaid are mounted in the slots 12 with their toes 16 bearing on the rear or upper surface of the carrier near the centre thereof.

The application of pressure to the carrier, as described, tends by a triple action of each jaw to rotate the jaws about the heels 17, swinging the teeth or engaging surfaces 18 inwardly into close contact with the stud or pin 19. More particularly the direct pressure of the carrier 5 against the toes 16 applies a short arm moment to the jaws about the heel 17, and the cam action of the surfaces 22 and 24 tends to both thrust the jaws directly inward against the stud and to rotate them about the heels 17, producing a combined gripping effect on the stud.

The block or jaw carrier 5 also has the important effect of providing a guide which moves with the jaws and prevents cocking and cramping of the jaws, effecting an important improvement over the prior art.

The gripping action described provides for rotating the stud or screw in setting. When the stud has been set or whenever the pressure on the shank 2 is relaxed, the jaws are released by the action of the spring 26 which rotates them about the heels 17, thrusting the block or carrier 5 outward and permitting the cam surfaces 22 to slide freely over the body surfaces 24.

I have thus described specifically and in detail a stud-setting chuck embodying the features of my invention in the preferred form; however, the specific terms herein are used descriptively rather than in a limiting sense, the scope of the invention being defined in the claims.

What I claim and desire to secure by Letters Patent is:

1. A stud setting chuck having a chuck body with a cylindrical bore, jaws therein and a sliding carrier fitting the bore and apertured to receive the jaws, which have means engaging the carrier from above, the carrier serving as an abutment to be engaged by the upper end of the stud to close the jaws which are provided with closing surfaces at their lower ends, the chuck body having cooperating closing surfaces whereby the jaws are closed as the chuck is forced down against the stud, the jaws being provided near their upper ends with curved surfaces which rock on the inner cylindrical surface of the chuck body.

2. A stud setting chuck having a chuck body with a cylindrical bore, jaws therein and a sliding carrier fitting the bore and apertured to receive the jaws, which have means engaging the carrier from above, the carrier serving as an abutment to be engaged by the upper end of the stud to close the jaws which are provided with closing surfaces at their lower ends, the chuck body having cooperating closing surfaces whereby the jaws are closed as the chuck is forced down against the stud, the jaws being provided near their upper ends with curved surfaces which rock on the inner cylindrical surface of the chuck body, the cylindrical bore engaging said surfaces, serving to prevent spreading of the upper ends of the jaws.

Signed by me at Baltimore, Maryland, this 11th day of August, 1925.

ALONZO GALLOWAY DECKER.